May 30, 1967 C. B. MAYER 3,323,004
DISTRIBUTED AMPLIFIER WITH INDUCTANCE-CONNECTED ANODE SEGMENTS
Original Filed July 16, 1962
6 Sheets-Sheet 1
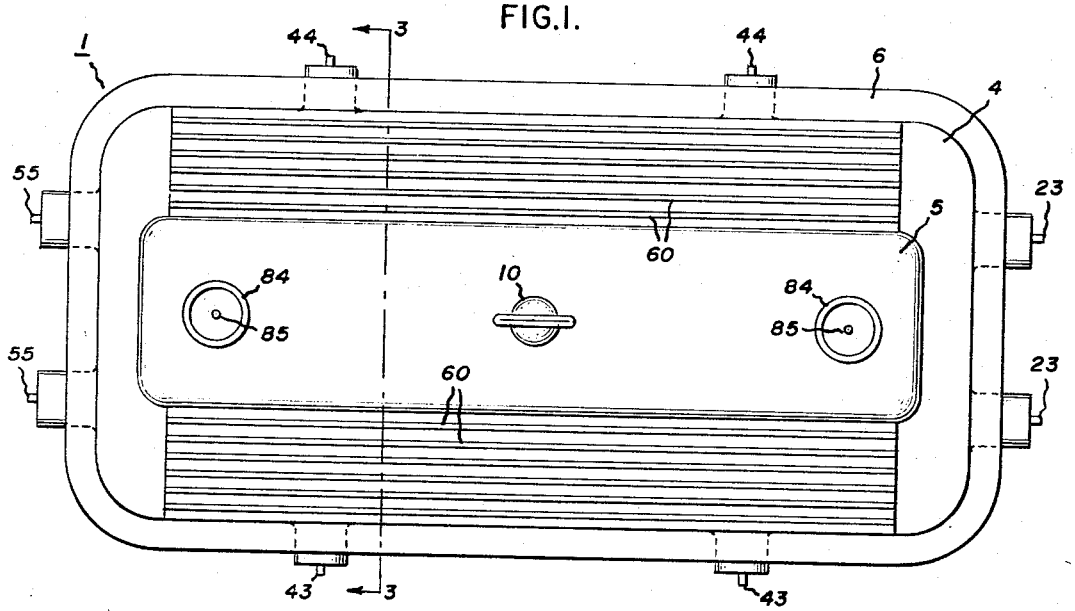
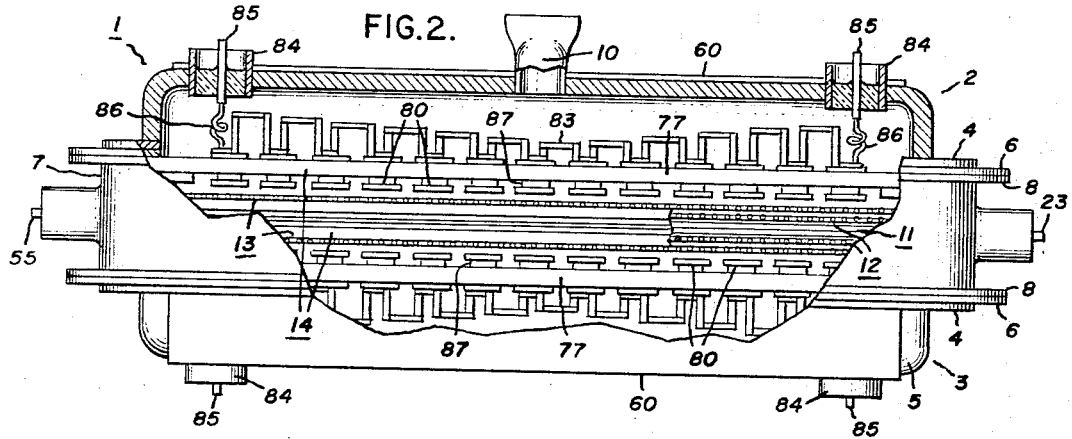
INVENTOR:
CHARLES B. MAYER,
BY *James J. Lichiello*
HIS ATTORNEY.

May 30, 1967 C. B. MAYER 3,323,004
DISTRIBUTED AMPLIFIER WITH INDUCTANCE-CONNECTED ANODE SEGMENTS
Original Filed July 16, 1962 6 Sheets-Sheet 2
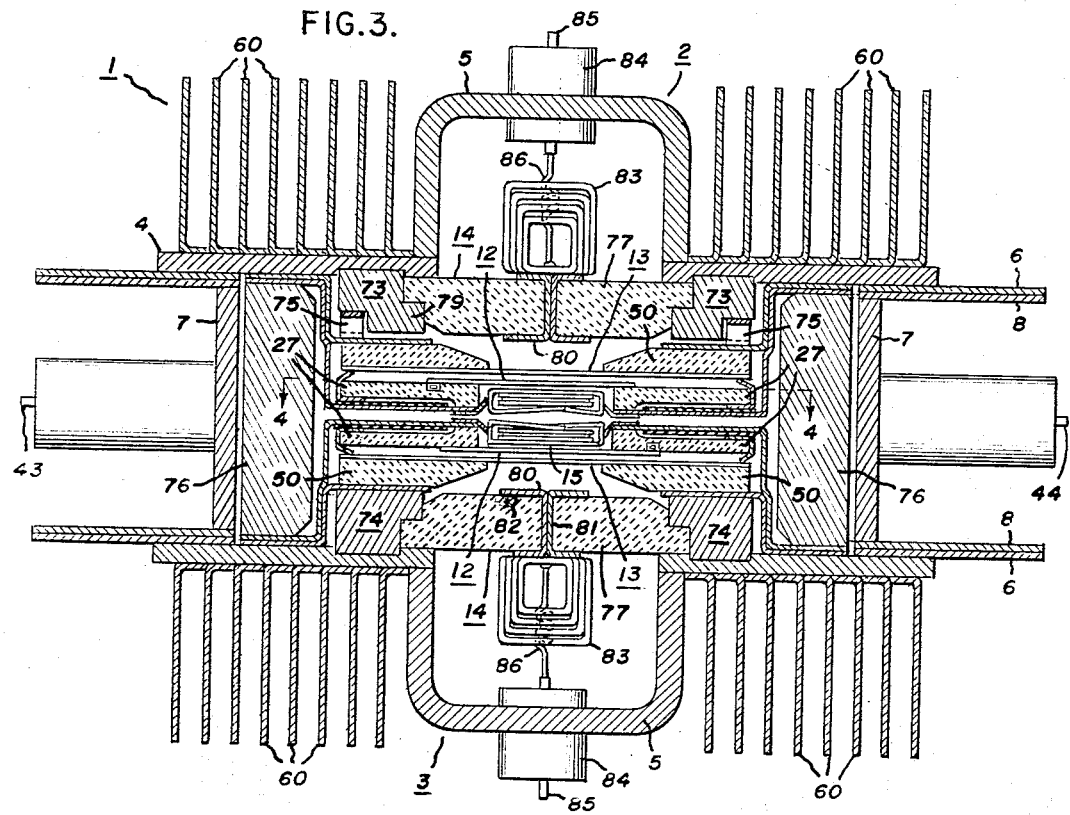
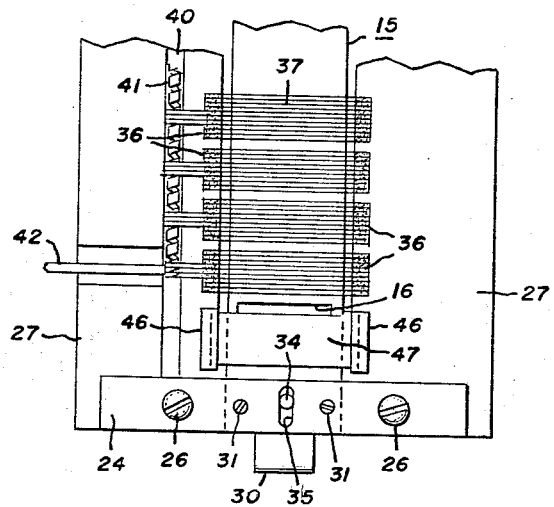
INVENTOR:
CHARLES B. MAYER,
BY *James J. Lichiello*
HIS ATTORNEY.

May 30, 1967 C. B. MAYER 3,323,004
DISTRIBUTED AMPLIFIER WITH INDUCTANCE-CONNECTED ANODE SEGMENTS
Original Filed July 16, 1962
6 Sheets-Sheet 5

INVENTOR:
CHARLES B. MAYER,
BY *James J. Lichiello*
HIS ATTORNEY.

May 30, 1967 C. B. MAYER 3,323,004
DISTRIBUTED AMPLIFIER WITH INDUCTANCE-CONNECTED ANODE SEGMENTS
Original Filed July 16, 1962 6 Sheets-Sheet 4
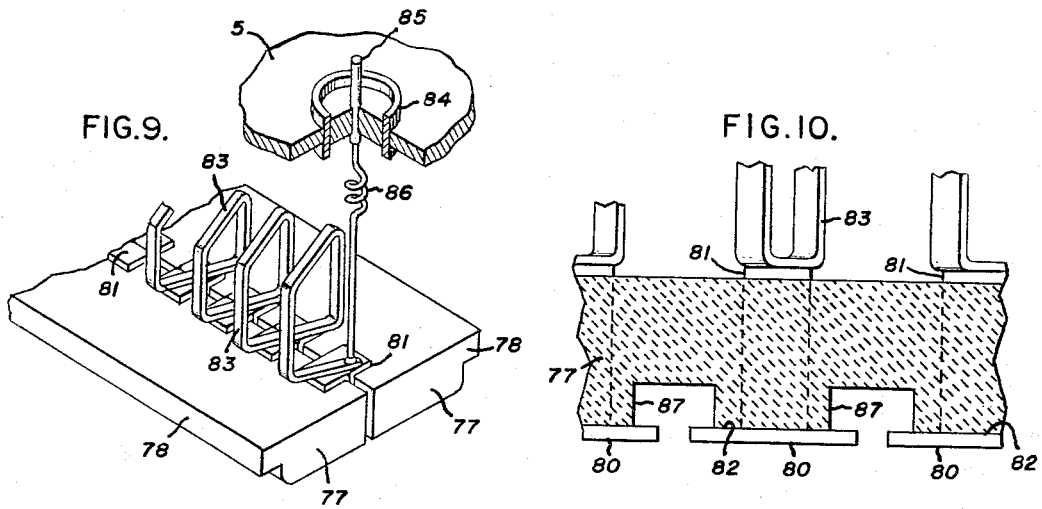
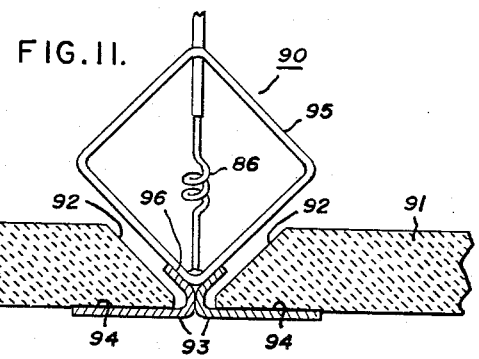
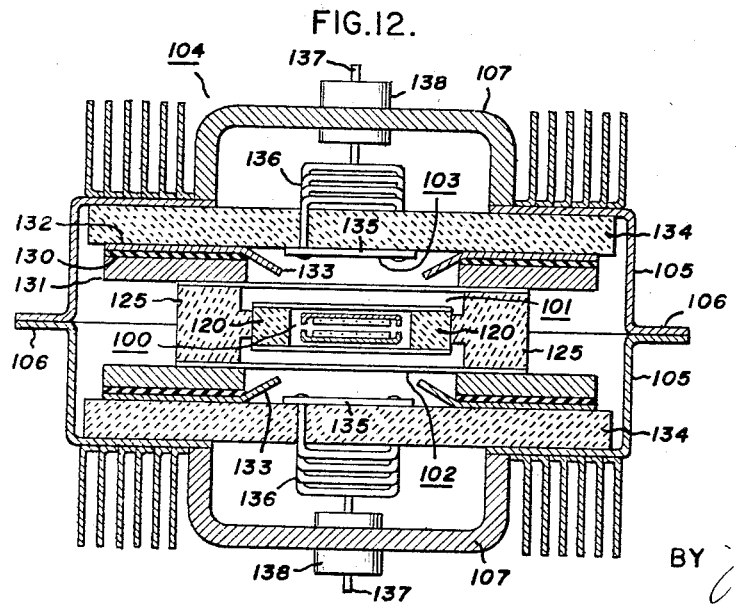
INVENTOR:
CHARLES B. MAYER,
BY *James J Lichiello*
HIS ATTORNEY.

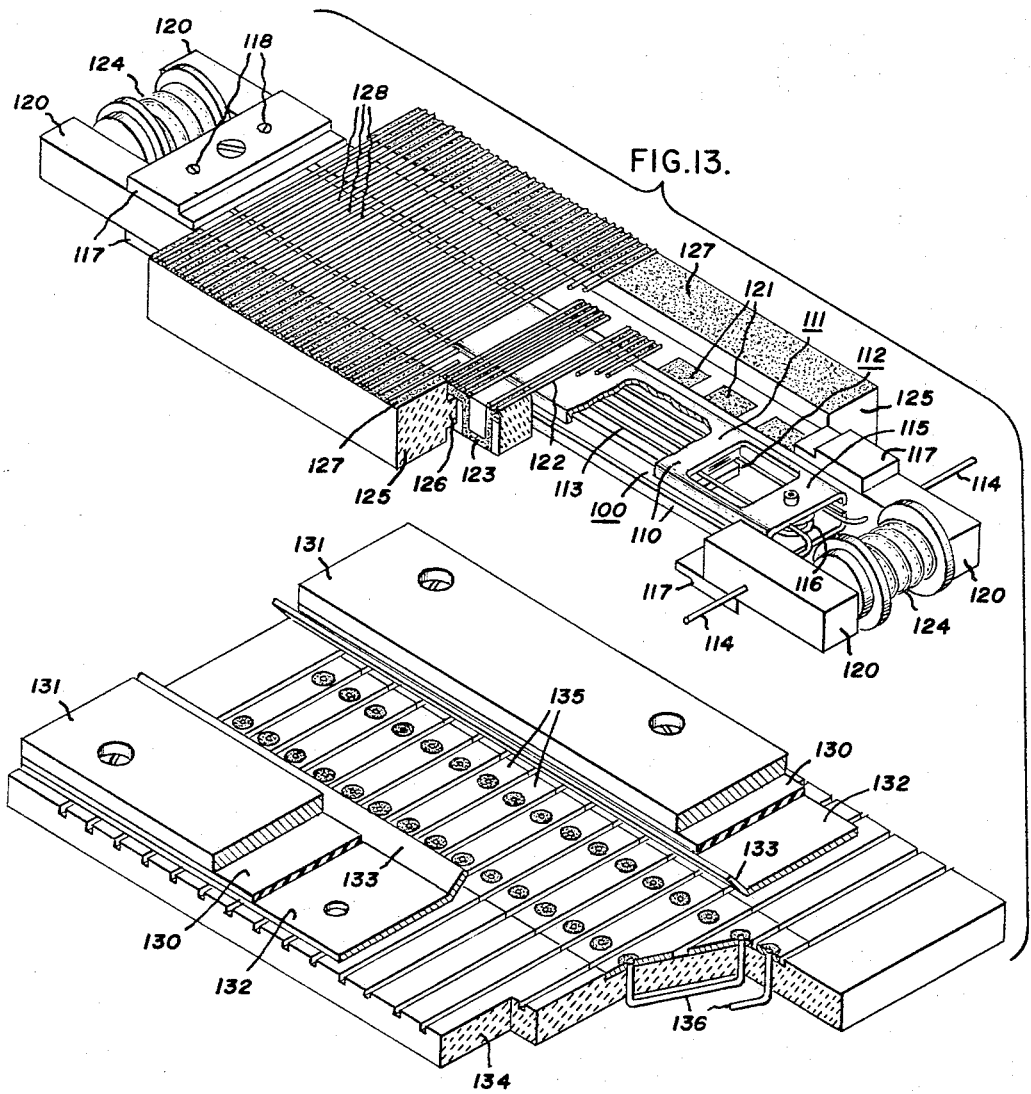

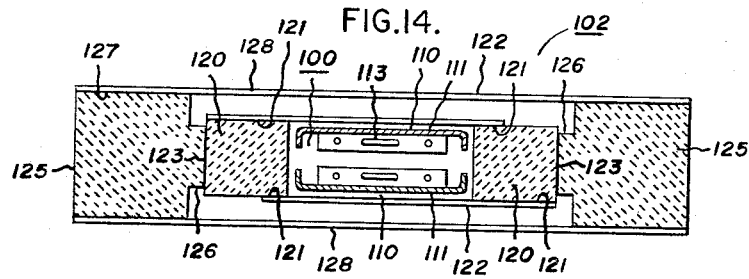
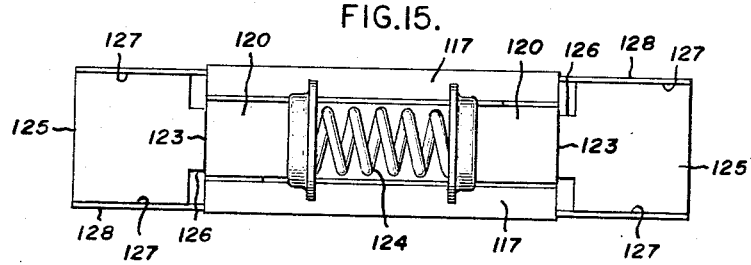
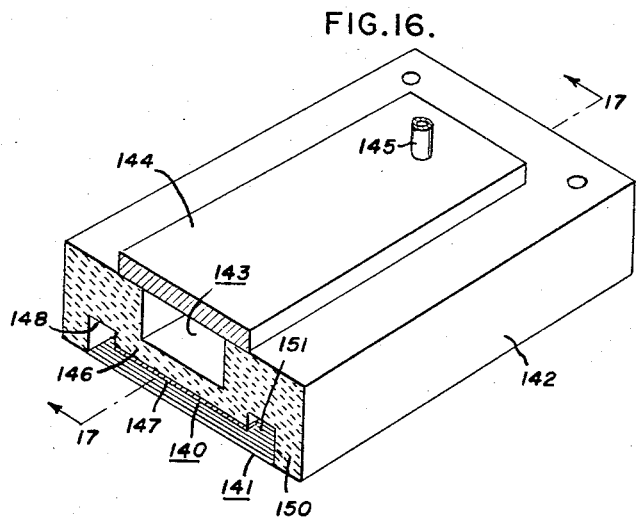
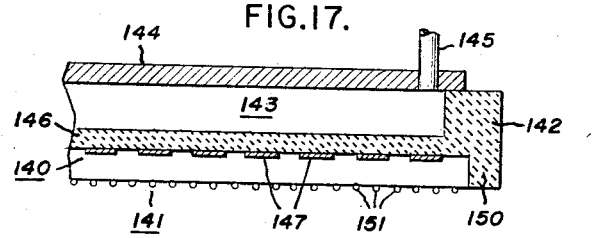
INVENTOR:
CHARLES B. MAYER,
BY James J. Lichiello
HIS ATTORNEY.

United States Patent Office 3,323,004
Patented May 30, 1967

3,323,004
DISTRIBUTED AMPLIFIER WITH INDUCTANCE-CONNECTED ANODE SEGMENTS
Charles B. Mayer, Scotia, N.Y., assignor to General Electric Company, a corporation of New York
Original application July 16, 1962, Ser. No. 210,064, now Patent No. 3,247,420, dated Apr. 19, 1966. Divided and this application Sept. 24, 1965, Ser. No. 489,831
9 Claims. (315—42)

My invention relates to electric discharge devices and pertains more particularly to electric discharge devices of the so-called planar distributed amplifier type adapted for the amplification of a wide band of radio frequencies.

This application is a division of my copending application Ser. No. 210,064, filed July 16, 1962, now U.S. Pat. No. 3,247,420, issued Apr. 19, 1966, and assigned to the same assignee as the present invention.

In certain applications it is desirable to provide electric discharge devices capable of affording high degrees of R.F. amplification over a substantially wide band of frequencies. Planar distributed amplifiers, including devices wherein all of the electrodes have been contained in a single evacuated envelope or enclosure, have heretofore been provided in the prior art for this purpose. However, the elongated planar constructions of the electrodes characteristic of such devices have confronted those active in the art with considerable problems, such, for example, as in the provision of adequate dissipation of heat developed at the anode transmission line, maintenance of planarity of electrodes and uniform interelectrode spacing with operating temperature changes and the provision of electrode subassemblies effective for affording those transmission line properties required in a distributed amplifier device.

The present invention contemplates the provision of a new and improved distributed amplifier tetrode including new and improved means for obviating some of the problems heretofore encountered. More specifically, the present invention contemplates a distributed amplifier device wherein all the active electrode elements are contained in a sealed evacuated envelope and which includes improved means for dissipating unwanted heat, for maintaining planarity and uniform interelectrode spacing of the electrodes and means for affording required transmission line properties for high efficiency, high-power and wide band distributed amplifier operation.

Accordingly, a primary object of my invention is to provide a new and improved single device distributed amplifier.

Another object of my invention is to provide a new and improved distributed amplifier device including new and improved electrode assemblies effective for providing required R.F. transmission line properties.

Another object of my invention is to provide a new and improved distributed amplifier device including new and improved means for conducting unwanted heat from the region of the active electrodes to the device envelope for dissipation thereby.

Another object of my invention is to provide a new and improved single device distributed amplifier including new and improved means for mounting and maintaining planar the active sections of elongated electrode assemblies therein.

Another object of my invention is to provide a new and improved single device distributed amplifier including new and improved R.F. output means therefor.

Further objects and advantages of my invention will become apparent as the following description proceeds and the features of novelty which characterize my invention will be pointed out with particularity in the claims annexed to and forming a part of this specification.

In carrying out the objects of my invention I provide a distributed amplifier device including an elongated conductive envelope containing a stacked arrangement of electrodes comprising a pair of back-to-back tetrodes. Supported in the midsection of the device are a pair of back-to-back elongated cathode assemblies including planar active surfaces and series-connected heater elements. Each tetrode section includes a control grid assembly comprising a spaced pair of ceramic support bars carrying a plurality of discrete control grid sections interconnected by inductance means to provide an input transmission line. Also included in each tetrode section is a screen grid assembly including a pair of spaced ceramic support bars carrying a plurality of screen grid wires. The control and screen grid wires have the same pitch and are accurately aligned. Cooperating with these electrodes in each tetrode is an anode assembly comprising a plurality of anode segments mounted on and electrically insulative, thermally conductive support member which makes thermal contact with the conductive wall of the device envelope. Also included in the anode assembly is an inductance element effectively cooperating with the anode segments to provide an output transmission line. Means are provided for making desired D.C. and R.F. connections to the various electrode assemblies and for conducting heat from the various assemblies to the envelope for dissipation thereby.

For a better understanding of my invention, reference may be had to the accompanying drawing wherein:

FIG. 1 is a plan view of a distributed amplifier device constructed according to an embodiment of my invention;

FIG. 2 is a partially sectionalized side elevation view of the device of FIG. 1;

FIG. 3 is an enlarged sectional view taken along the lines 3—3 in FIG. 1 and looking in the direction of the arrows;

FIG. 4 is an enlarged fragmentary detailed illustration of the control assembly of the device of FIGS. 1 to 3 taken along the lines 4—4 and looking in the direction of the arrows;

FIG. 7 is a fragmentary perspective view illustrating details of the cathode mounting and control and screen grid mounting arrangements;

FIG. 9 is an enlarged fragmentary perspective illustration of the anode assembly and output structure;

FIG. 10 is an enlarged fragmentary sectional view illustrating details of the anode segments mounting arrangements;

FIG. 11 is a fragmentary sectionalized view of a modified form of anode transmission line;

FIG. 12 is a sectional view of a modified form of the present invention;

FIG. 13 is an enlarged fragmentary and exploded perspective illustration of the electrode assemblies of the device of FIG. 12;

FIG. 14 is an enlarged sectional view of the cathode-control grid-screen grid assemblies in the device of FIG. 12;

FIG. 15 is an enlarged end view of the structure of FIG. 14;

FIG. 16 is a sectionalized perspective view of another modified form of the invention; and FIG. 17 is a sectional view of the structure of FIG. 16 taken along the lines 17—17 and looking in the direction of the arrows.

Figure 5:
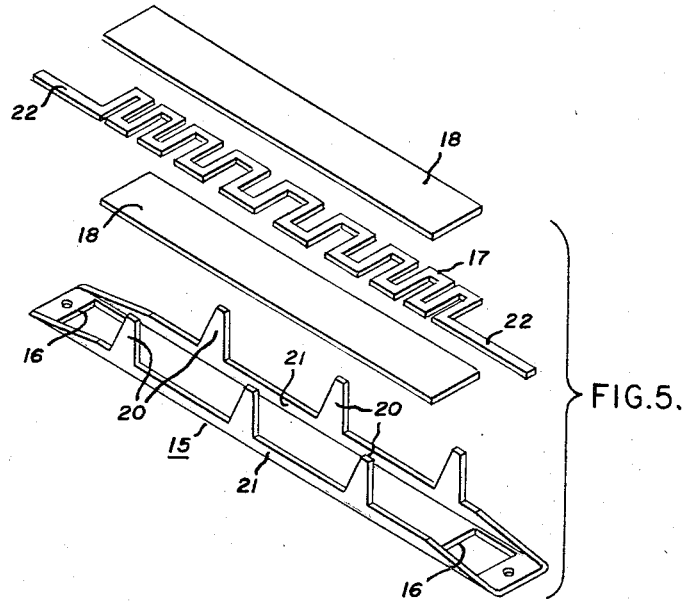
FIG. 5 is an exploded perspective view of the cathode assembly.

Referring to FIGS. 1–10, there is shown one embodiment of a distributed amplifier tetrode constructed according to my invention. More specifically, in FIGS. 1–3, there is illustrated a distributed amplifier tetrode, contained in a single evacuated envelope, generally designated 1. The envelope 1 includes upper and lower sections 2 and 3, respectively, each including a plate-like member 4 having a rectangular opening formed therein, an elongated conductive dome-like shield section 5 having the rim thereof hermetically joined to the rim of the aperture in the member 4 and an outwardly extending generally rectangular sealing flange 6 hermetically joined to the outer rim of the member 4. Interposed between the sections 2 and 3 is an intermediate rectangular wall section 7 having a circumferential sealing flange 8 sealed to each the upper and lower edges thereof. The flanges 6 on the upper and lower sections and the flanges 8 on the intermediate wall section have registering edges which are hermetically sealed as by welding to complete the envelope structure. An exhaust tubulation 10 is provided on the upper envelope section and is adapted for being pinched off and thus sealed in the manner shown after it is used in the evacuation of the device envelope.

As shown somewhat schematically in FIG. 2, the device includes two opposed, or back-to-back, tetrode structures each including a cathode assembly 11, a control grid assembly 12, a screen grid assembly 13 and an anode assembly 14. These various assemblies are suitably mounted to provide extremely close interelectrode spacing between the active electrode sections thereof and will each be described in detail hereinafter.

As perhaps best seen in FIG. 3, the back-to-back tetrode structures are constructed and assembled in the envelope 1 in a stacked arrangement. Additionally, the tetrodes are identical to each other and therefore a detailed description of only the upper one in FIG. 3 will suffice and will hereinafter follow.

The cathode assembly 11 of the device is shown in FIGS. 3, 4, 5 and 6, and includes an elongated beam-like cathode element 15 having an elongated rectangular planar active, or electron emissive, surface, thereon. The element 15 is preferably formed of a refractory metal such as tungsten or molybdenum or alloys thereof. Additionally, the end regions of the element 15 are formed with enlarged apertures 16 for thermally isolating the active sections thereof, or minimizing heat transfer to the ends of the elements. This structure has the desirable effect of maximizing thermal efficiency of the device and providing more uniform heating and thus more uniform emissivity of the several tube sections constituting the distributed amplifier.

The cathode assembly is energized by a heating element 17 sandwiched between a pair of insulative plates 18 and which heating element, as seen in FIG. 5, can comprise a serpentine filament. Additionally, and as best seen in FIG. 5, the spacing between the turns or sections making up the filament 17 is smaller at the end regions. Thus, the filament is adapted for providing greater power at the end regions to compensate for greater heat losses therefrom, thereby to afford more uniform temperature along the length of the cathode with resultant more uniform device operation along the length of the device.

Figure 6:
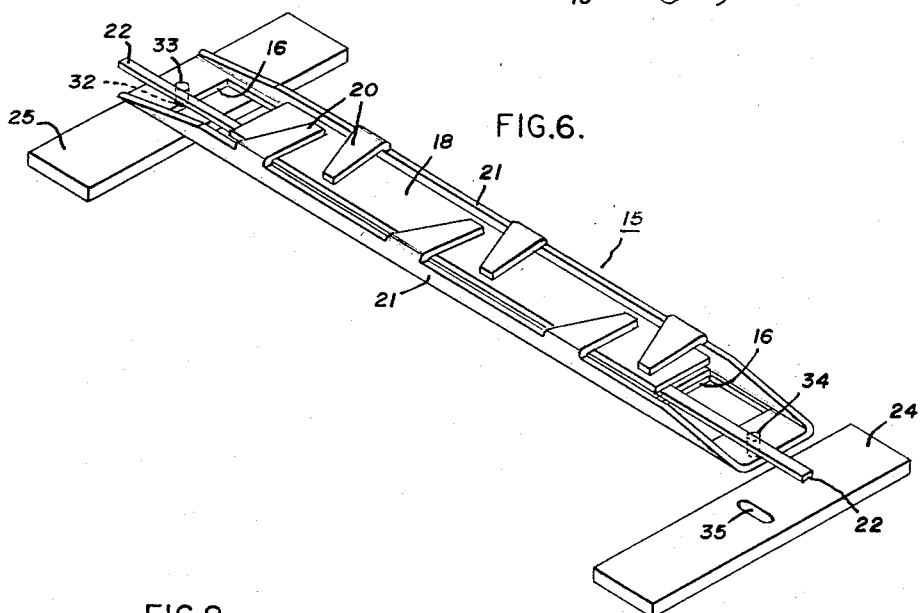
FIG. 6 is a perspective view of the assembled cathode assembly.

The heater assembly comprising the filament 17 and the insulative plates 18 is retained in the element 15 by a plurality of retaining tabs 20 formed off sidewall sections 21 on the element 15 and bent inwardly and downwardly against the heater assembly in the manner shown in FIG. 6. The tabs 20 are tapered for thus facilitating insertion of the heater assembly in the element 15 under the tabs. As shown in FIG. 6, the filament includes longitudinally projecting connectors 22. The connector 22 at one end of the cathode assembly is connected to the corresponding end of the filament of the other cathode assembly in the device and the connectors 22 at the opposite ends of the cathode assemblies are each conductively connected in a suitable manner to heater terminals 23 mounted on the sidewall of the device as seen in FIGS. 1 and 2. Thus, the device is adapted for having a single heater circuit completed through the filaments of both cathode assemblies to effect energization thereof for rendering the active surfaces of the cathode elements 15 emissive. The cathodes are operated at ground R.F. potential and means provided for conductively connecting the cathode assemblies to the conductive wall of the device envelope which is also at ground potential will be described in detail hereinafter.

In the described device the planarity of the active surface of the cathode element 15 must be maintained to ensure substantially uniform close interelectrode spacing with respect to the next adjacent element and to avoid electrical shorting to the adjacent elements as well as any appreciable variance of the interelectrode spacing with temperature changes. Such planarity is assured both by the rigidizing effects of the sidewall section 21 of the element 16 and a mounting arrangement which permits longitudinal expansion and contraction of the cathode element with temperature variations. The mounting arrangement comprises a pair of metal cross bars 24 and 25 rigidly secured, as by machine screws 26 and spring washers, across the opposite ends of a spaced parallel pair of longitudinally extending ceramic support bars 27. The ceramic bars 27 also serve as control grid support elements, which function thereof will be brought out in detail hereinafter. The inner surfaces of the metal bars 24, 25 serve as cathode-locating reference surfaces and are engaged by the end portions of the cathode element 15 outwardly of the apertures 16 therein. At each end of the device there is provided a resilient member 30 which can be a generally C-shaped leaf spring and which effectively engages the cathode element 15 of each tetrode for biasing it into engagement with the reference surface on its respective cross bars 24, 25. When so engaged by the cathode element the bars 24, 25 determine the spacing relative to the next adjacent elements which are the mentioned control electrodes. Each bar 24, 25 carries a pair of adjusting screws 31 adapted for engaging the corresponding end of the respective cathode element for enabling adjustment of the spacing relative to the adjacent electrodes. Additionally, the cross bars 25 at one end of the device include apertures 32 shown in one of the cathode assemblies illustrated in FIG. 6, which apertures receive pins 33 carried by the corresponding ends of the cathode elements 15 and thus are provided for securing those ends of the cathodes to prevent longitudinal movement thereof relative to the crossbars 25. As also illustrated in FIG. 6, the other ends of the elements 15 carry pins 34. However, at these ends the pins 34 are disposed in elongated, longitudinally extending slots 35 formed in the cooperating cross bars 24. Thus, the elements 15 are adapted for thermal expansion and contraction movements without effecting undesirable distortion of the planar active surfaces of the elements.

In the stacked arrangement of electrode assemblies comprising each tetrode, the control grid assembly 12 is next adjacent the cathode assembly and includes the above-mentioned ceramic bars 27 as the support elements therein. The bars 27 are preferably formed of alumina and, as disclosed above, are maintained in parallel spaced relation by the metal cross bars 24 and 25 which serve alos in the mounting of the cathode assembly. In the event greater heat dissipation should be desired the bars 27 can be advantageously formed of beryllia. As best seen in FIG. 4, the inner upper edge surface portions of the bars 27 are provided with series of spaced mutually isolated metalized areas 36 to each of which is suitably conductively bonded an array of closely spaced parallel grid wires 37. Each array of grid wires constitutes a discrete planar control grid section of the distributed amplifier and is electrically insulated or isolated from adjacent grid elements. Additionally, the surface of one of the ceramic bars 27 is formed with a longitudinally extending groove 40 in which is positioned an elongated inductance element 41 which, as seen in FIGS. 4 and 7 can be in the form of a coiled inductor. At equally spaced intervals along the control grid assembly, several of the wires of each discrete control grid section extend outwardly and are conductively connected to the inductance element 41 and, thus, the control grid assembly is adapted for serving as a transmission line including a plurality of individual grid sections interconnected by inductances comprising sections of the elongated inductance element 41. The element 41 is provided with a pair of connectors 42 each located at an opposite end of the assembly (only one of which connector is shown in FIG. 4) and which extend outwardly and are each connected to the inner conductor of one of a pair of coaxial R.F. grid terminals 43 mounted on the sidewall of the device. The outer conductors of the grid terminals 43 make electrical contact with the metal envelope wall. The control grid assembly 12 of the other tetrode in the device is identical in structure to that just described but is arranged invertedly in respect thereto and so as to make connections with a second pair of coaxial R.F. grid terminals 44 located on the opposite side of the device envelope.

In order to maintain the control grid wires taut and thereby to avoid interelectrode shorts or variations in interelectrode spacing as may be caused by sagging of the grid wires resulting from thermal expansion thereof, I have provided meann for maintaining the grid wires constantly under tension. More specifically, and as best seen in FIGS. 4 and 7, I have provided means for biasing the control grid wire support bars 27 apart, thereby to maintain the grid wires taut and to compensate for any tendency of the wires to sag when heated. Such grid tensioning means are provided at both ends of the grid assembly; however, inasmuch as they are identical the description of one herein will suffice. The grid tensioning means comprises a metal stop block 46 secured to each bar 27. Positioned between the blocks 46 and having the ends thereof abutting the blocks is a composite leaf spring assembly 47. The spring assembly 47 is flexed, or bowed, and includes a plurality of individual leaf springs which urge the blocks 46, and therefore the bars 27, outwardly, which cooperation has the desired effect of maintaining the grid wires secured across the bars 27 in constant tension for thus overcoming any tendency to deviate from the desired coplanar state as by sagging or vibrating.

Located in the stacked arrangement of electrode assemblies comprising each tetrode immediately adjacent the control grid assembly 12 is the screen grid assembly 13. The assembly 13 is generally similar to the control grid assembly 12 and includes a spaced parallel pair of ceramic support bars 50 which can also be advantageously formed of alumina, or beryllia, if greater heat dissipation should be desired. The bars 50, however, are provided with inclined surfaces 51 which serve to render the inner portions of the bars relatively remote from the conductive elements of the anode assembly 14 which will be described in greater detail hereinafter. This remote location of the inner portions of the bars 50 serves to provide a minimum anode to screen capacitance.

The screen grid assembly 13 also includes an array of closely spaced parallel grid wires 52 which are bonded to metalized conductive areas 53 provided on the under surfaces of the ceramic bars 50. The wires of the screen grid assembly are maintained taut by tensioning means which, as seen in FIG. 7, can be substantially similar to that provided for the control grid assembly. In view of this substantial similarity of structure no detailed description is believed necesary; however, it is to be noted that this tensioning structure is further provided with adjusting means which can comprise set screws 54 threadedly mounted in tabs (not shown) carried by the grid support bars 46.

In the above-described structure the control and screen grid structures are constructed to provide the same pitch between adjacent wires. Also, the wires of the control grid are aligned with the wires of the screen grid to minimize screen grid current interception and to optimize beam power tetrode characteristics.

By means not shown, the screen grid assemblies are each conductively connected to the center conductor of an R.F. coaxial connector 55 mounted on the end wall of the device and seen in FIGS. 1 and 2. Heat is transmitted from the screen grid ceramic 50 to the envelope of the device for dissipation thereby by means of sheet-like high-heat-conductivity members 56 bonded to metalized areas 57 provided on the upper surfaces of the screen grid ceramics. These members are preferably formed of copper and the outer edges thereof are securely fastened between metal blocks 58 and the plate-like members 4 immediately beneath heat radiating fins 60 mounted thereon.

Sheet-like high-heat-conductivity members 61, also preferably formed of copper, are provided for interconnecting the cathode assemblies and the device envelope in order to enable operation of the cathode at ground potential in the above-mentioned manner. The members 61 include sections 62 wihch extend inwardly to the inner edges of the control grid ceramics 27 and which are bonded to metalized areas 63 provided on shoulder portions 64 of the ceramics. Contact members 65 are conductively bonded to the inner edges of the sections 62 and engage the side portions of the cathode members 15 in the manner best seen in FIG. 8.

The conductive connections of the inner edges of the sections 62 to the shoulder portions 64 of the ceramics have a desirable effect of conducting heat outwardly through the members 61 from points immediately adjacent the heat source, namely, the cathodes. Thus, any tendency for heat to be transmitted through the ceramics 27 is minimized, which has the highly desirable effect of minimizing any tendency toward thermal distortion thereof which would adversely affect uniform tautness of the control grid wires 37 and cause sagging resulting in non-uniformity of the interelectrode spaces or shorting of elements along the lengths of the assemblies.

Figure 8:
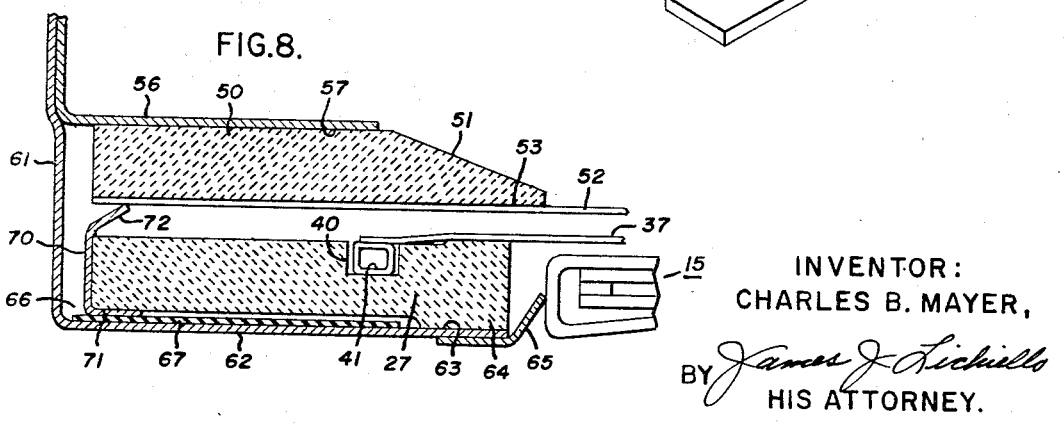
FIG. 8 is an enlarged fragmentary sectional view illustrating details of the cathode-screen-grid bypass structure.

As also seen in FIG. 8, there is provided on each side of each tetrode device a screen grid-cathode R.F. bypass generally designated 66. Each such bypass comprises a sheet-like dielectric element 67 which can advantageously comprise a thin sheet of mica having metallic coatings on both sides thereof. The dielectric element 67 is positioned between and one metalized surface thereof makes electrical contact with the section 62 of the corresponding member 61 and the underside of the corresponding ceramic bar 27 in a recess in the latter element resulting from the provision of the shoulders 64.

The other metalized surface of the dielectric element 67 is conductively connected to the screen grid assembly 12 by an elongated sheet-like metal connector 70. The connector 70 is fitted about the outer edge of the ceramic bar 27 and has an edge portion 71 extending inwardly between the dielectric element and ceramic 27 and making electrical contact with a metalized surface of the dielectric element. The connector 70 also includes an oppositely disposed edge portion 72 extending between the screen grid and control grid ceramics and making electrical contact with the metalized surface 53 on the corresponding grid ceramic. The just-described arrangement provides an effective R.F. current bypass between the cathode and screen grid and in a manner which is compatible with the effective conduction of heat past the control grid ceramic 27.

As best seen in FIG. 3, the internal structure of the device also includes elongated conductive members 73 located in the upper region of the device and similar members 74 located in the lower region of the device. These members are anode brazing clamps and are provided to hold the anode assemblies which are now about to be described in detail in position during construction of the device. Additionally, the members 73 and 74 serve together with resilient elements 75, which can be longitudinally extending bowed leaf springs interposed between the upper members 73 and the upper screen grid assembly 12, in holding the stacked arrangements of electrode assemblies comprising both tetrodes firmly in position and in cooperation with spring blocks 76 provide the desired anode to screen grid spring.

Each anode assembly 14 comprises a pair of dielectric support elements 77 which are formed with outer edge portions 78 adapted for being metalized and brazed firmly between the inner rims of the plate-like elements 4 and shoulders 79 on the clamps 73 or 74. This arrangement allows materials of significantly different expansion coefficient such as beryllia and copper to be successfully joined. The support elements 77 are formed of a high-heat-conductivity, electrically insulative material such as beryllia and thus is effective for supporting an anode circuit carried thereby in insulated relation to the device envelope while providing for desirable high heat conduction to the envelope for dissipation thereby. Additionally, in the arrangement illustrated, direct substantial heat paths are provided by the elements 77 to the plate-like conductive wall members 4 which carry the heat radiators 60.

The anode circuit is best seen in FIGS. 2, 3, 9 and 10 and includes a plurality of spaced active anode segments 80. The active segments 80 are each formed by a pair of cooperating metal generally J-shaped elements 81 which have midsections arranged back-to-back between the insulative members 77. The inner surface portions of the members 77 are provided with appropriate metalized sections to which the inner sections of the J-shaped members 81 are brazed and secured by metallic bonds 82 to hold the elements 81 in place. The outer sections of the J-shaped members 81 are conductively joined together and to a common inductance element to be described hereinafter. In this arrangement the ceramic members 77 of the anode structure 14 transfer substantial quantities of heat from the anode segments 80 to the device envelope and are predeterminedly constructed to avoid adverse effects resulting from such heat. Additionally, the ceramic members 77 are not directly joined and are free to move relative to each other. Thus, the anode structure 14 is adapted for minimizing thermally caused tensile stresses at the ends of the structure, thereby to avoid fracture of the ceramics and possible tube failure.

The above-mentioned common inductance element, or inductor, is designated 83 and can advantageously comprise a conductive coil as shown in FIG. 2. The inductor 83 and the anode segments cooperate to provide an anode transmission line having the required characteristics for distributed amplifier operation. Additionally, and as seen in FIGS. 2 and 3, the upper and lower shield sections 5 of the envelope house the inductors 83 in spaced relation thereto and each shield section carries a pair of longitudinally spaced coaxial R.F. terminals 84 including outer conductors electrically connected to the conductive envelope wall and insulated inner conductors 85. The inner ends of the inner conductors 85 are each conductively connected to a respective end of the inductors 83. Thus, the shield section of the envelope and the inductors 83 cooperate in providing an R.F. output section with the coaxial connectors 85 constituting the R.F. terminals for an output circuit.

As best seen in FIG. 2, the inductors 83 have progressively diminishing cross sections, or smaller coil sections, toward the center thereof. This arrangement provides for constant total inductance in the anode circuit between each adjacent pair of anode segments 80. Inasmuch as the total inductance between adjacent anode segments consist of the self inductance of the individual inductor turns plus the mutual inductance to adjacent turns, the total inductance between anode segments decreases from the midpoint of the inductor toward the ends thereof. This non-uniform total inductance results from the decrease in mutual inductance as the end of the inductances are approached and can adversely affect the operation of the device. The progressively diminishing cross section of the inductances 83 approaching the midpoints thereof is effective to provide uniformity of total inductance across the lines. Thus, the R.F. network properties of interest in the design of the anode remain constant across the device. This improves tube performance at high frequencies and facilitates impedance matching of the network to the load at the output.

Another problem encountered in a single device distributed amplifier is that of transferring the power through the tube envelope. It has been found particularly difficult to avoid a shunting capacity in the line at the output terminal, or across the seal between the inner and outer conductors of the coaxial terminals 84, when the impedance of the network is relatively high, such as, for example, as 200 ohms or more. This problem is overcome in the present device by constructing the output terminals in such a manner as to have the same capacity as each of the anode segments and to provide an inductance in the output connector of the same value as the anode inductance. As seen in FIG. 9, the required inductance in the anode connectors can be provided by individual coils 86. In this manner each output arrangement is made to operate electronically as another identical section of the lumped anode transmission line. Therefore, in operation there is no mismatch or reflected power at the outputs due to seal capacitance. The anode construction described above is identical for both tetrode sections of the device.

I have found that unless capacitance between adjacent anode segments 80 is reduced, such capacitance can adversely affect the high frequency properties of the transmission line. As seen in FIG. 10, reduced capacitance between anode segments is accomplished by providing transverse grooves or recesses 87 which have substantially greater widths than the spacings between adjacent anode segments. Additionally, this construction provides for shading of substantial areas of the walls of the recesses by the segments and thus avoids the deposition of sputtered or sublimed conductive cathode material on the shade areas which minimizes any possibility of short circuiting of adjacent segments.

Illustrated in FIG. 11 is a modified form of anode assembly generally designated 90 and which can be employed in place of the anode assembly 14 of the first-described embodiment. This assembly 90 includes two beryllia support members 91 which can be substantially the same in structure and function as the ceramics 76 but which are formed with inclined surfaces 92 which form an elongated trough when the members 91 are held together. Provided in the structure at periodically spaced sections along the length thereof are metal elements which cooperate to form active spaced anode segments 93. These segments are arranged in spaced relation along the length of the anode assembly and are brazed at 94 to metalized sections of the members 91. Fitted in the trough portion of the ceramic structure is an inductor 95 which is preferably in the form of a coil having a rectangular cross section and standing on an edge in the trough. The edge of the coil in the trough has individual turns thereof suitably conductively bonded at 96 to short portions of the anode segments extending between the inner edges of the ceramics and disposed in the trough. In this arrangement too the ceramic members are not directly joined and are free to move relative to each other which avoids the presence of destructive thermal stresses in the anode structure.

Where substantial inductance is present between the inductor and active anode segments, the high frequency properties of the network can be affected to the extent of reducing the cutoff frequency. The anode circuit construction of FIG. 11 involves a relatively short conductive connection between the inductor and the active portions of the anode segments 93 located on the inner surface of the ceramic and thus minimizes the inductance introduced into the network between the coil 95 and the active segments 93 for thereby substantially eliminating the undesirable inductance and improving the network properties of the anode circuit. In this embodiment also the inductors can advantageously comprise coils having diminishing cross sections toward the midpoints thereof in order to provide uniform total inductance along the lengths of the anode circuits. Also, the output connectors can be provided with seal capacitances and inductances effective to make them appear electrically as sections of the transmission line identical to those sections of the lumped anode transmission line formed by the anode segments 93 and the inductor 95.

Illustrated in FIG. 12 is another modified form of my invention which includes cathode assemblies 100, control grid assemblies 101, screen grid assemblies 102 and anode assemblies 103, all in a stacked arrangement housed in an evacuated conductive envelope designated 104. The envelope 104 can comprise a pair of elongated metal tray-like elements 105 hermetically sealed at outer flange sections 106. Additionally, the elements 104 are apertured and have sealed thereto about the apertures the rims of elongated conductive dome-like shield elements 107.

From the outset of the description of this embodiment it is to be understood that, as in the first-described embodiment, the envelope of the device is provided with suitable connectors for providing appropriate operating potentials on the several electrodes, for energizing the cathode heaters and for providing appropriate R.F. input signals for amplification and for extracting the amplified signals. However, for simplification of illustration all such connectors have not been shown in the drawing.

The cathode assemblies 100 are located centrally in the device in back-to-back relation and, as seen in FIGS. 12–14, each cathode assembly 100 includes an elongated channel-like conductive element 110 having a planar active surface 111. The element 110 contains a heater arrangement 112 including a serpentine resistance filament 113. The filaments of both cathode assemblies are joined in series and leads 114 are provided for making electric connections to suitable heater connectors mounted on the tube envelope and not shown.

Additionally, each element 110 includes end portions 115 which are apertured for minimizing heat loss from the ends of the device. This serves to maintain the device more uniformly heated along the length of the cathodes and thus adapts the distributed amplifier sections of the device for more uniform operation.

Interposed between the corresponding end portions of upper and lower cathode elements 110, and as shown in FIG. 13, there are provided coil springs 116 which urge the elements 110 against reference surfaces on metal cross bars 117 thus to determine the interelectrode spacing relative to the next adjacent electrode assemblies. Adjustment screws 118 carried by the cross bars 117 are provided for enabling predetermined adjustments of the cathodes relative to the reference surfaces.

The cross bars 117 extend across a spaced parallel pair of elongated ceramic support rods 120 included in the control grid assembly 101. The support rods 120 include metalized upper and lower surfaces 121 to which are bonded the closely spaced parallel grid wires 122 of the control grids of both the upper and lower tetrodes. Additionally, and as best seen in FIGS. 13 and 14, the side surfaces of the support rods 120 carry inductance elements 123 which can each advantageously comprise a metalized serpentine conductive path. The grid wires 122 on one side of the control grid assembly are subdivided into separate groups and the wires of each group are interconnected by spaced metalized areas and each metalized area is electrically connected to a section of an inductance element 123 on one side of the assembly. This arrangement is effective for affording the transmission line properties required in the operation of the device as a distributed amplifier. More specifically, the described combination of inductances and capacitances provided by the structure is effective for forming an artificial low pass transmission line filter with a satisfactory characteristic impedance in the range of 30 to 50 ohms and a cut-off frequency above 1000 megacycles.

A grid transmission line structure identical to that just described is provided in the lower tetrode section of the device. Specifically, the other ceramic bar 120 carries a serpentine inductance element identical to that designated 123 above and which has electrically connected thereto spaced sections of the control grid assembly of the other tetrode structure of the device, thereby to provide the desired transmission line properties. The tension of the control grid wires is maintained by a pair of coil springs 124 each located between a pair of opposed ends of the ceramic bars 120 in the manner shown in FIGS. 13 and 15. Means not shown are provided for making suitable electrical connections to the control grids.

The screen grid assembly 102 includes a pair of elongated ceramic support bars 125 which have inwardly extending portions 126 engaging the outer side surfaces of the control grid support bars 120. Also, the upper and lower surfaces of the bars 125 are provided with metalized areas 127 and have bonded thereto closely spaced parallel screen grid wires 128. Also, the inner surfaces of the bars 125 are metalized in patterns corresponding to the serpentine inductances 123 on the bars 120 and the bars 125 are thereby adapted for being brazed to the bars 120 in the manner shown. The thicknesses of the bars 125 determine the interelectrode spacing between the screen and control grids. Also, tensioning of the screen grid wires is effected by the coil springs 124 through the control grid support bars 120.

The screen grids are adapted for operating at the same potential as the device envelope and electrical contact to the envelope wall is effected by conductive means not shown. Additionally, the screen grid wires have the same pitch as the control grid wires and are aligned therewith for the above-discussed purpose.

Provided in each of the tetrode structures is a combined beam forming and screen grid-cathode bypass structure comprising a sheet-like dielectric element 130 located on each side of the device. Each dielectric element 130 is sandwiched between a conductive plate 131 resting on the screen grid and electrically contacting same and a sheet-metal plate 132. The beam-forming plates make electrical contact with the cross bars 117 which engage the cathode for thus placing the beam-forming plates at cathode potential. Additionally, the beam-forming plates include inclined inner portions 133 which project into the interelectrode region toward the screen grid and thus serve in forming the electron beams projecting from the cathode to the anodes of the device.

The beam-forming plates 132 engage the undersurface of an electrically-insulative, high-heat-conductivity support member 134 included in each of the mentioned assemblies 103. The support members 134 can advantageously be formed of the same material as the anode support members in the first-described embodiment, namely, beryllia. Additionally, each support member 134 engages the inner surface of the corresponding one of the envelope members 105 for maximum heat transfer thereto and to the heat radiating fins mounted thereon.

As perhaps best seen in FIG. 13, the anode assembly comprises a plurality of equally laterally spaced conductive active segments 135 which can constitute metallic plates bonded to the ceramic member or parallel metalized sections. The member 134 is provided with transverse grooves coincident with the spaces between the anode segments to minimize any tendency for electrical shorting of segments by deposited conductive material. Additionally, the opposed ends of the immediately adjacent anode segments are electrically interconnected by bail-like, or generally U-shaped, inductance elements 136 having legs projecting through suitable apertures in the insulative member 134 and a midsection disposed on the outer side of the insulative member and extending in the dome-like shield section of the envelope. Thus, an anode circuit is provided wherein the bail-like elements provide inductances between the active anode segments. At each end of the anode assembly the anode circuit is conductively connected by a metal tab to the center conductor 137 of a coaxial R.F. output terminal 138. The terminals 138 include outer conductors making electrical contact with the conductive device envelope. The just-described anode assembly including the two coaxial R.F. output terminals associated with each such assembly is identical for both the upper and lower tetrode structures.

If desired, the inductive elements 136 can be diminishing dimensions toward the center of the line for the same purpose that the coil in the first-described embodiment is arranged to be of diminishing cross section toward its midpoint. Additionally, if desired, the output seal capacitances of the output terminals 138 can be made equal to the anode segment capacitances and inductances can be provided in the connections to the output center conductor equal in inductance values to the inductance in the line between anode segments in essentially the same manner as described above and for the purpose of facilitating matching of the line to a load.

Illustrated in FIGS. 16 and 17 is still another modified form of my invention and specifically includes an assembly adapted for having a fluid coolant circulated therethrough. For purposes of facilitating illustration, I have shown only an assembly including an anode structure 140 and a grid element 141. The device can be otherwise similar to any of those described above.

In the structure of FIGS. 16 and 17 there is provided a ceramic support member 142 which can be advantageously formed of beryllia or any other material which is electrically insulative and characterized by sufficient thermal conductivity. The member 142 is formed with an elongated central recess 143 and is provided with a cover 144 to complete a coolant chamber. A coolant inlet 145 can be provided as well as an outlet (not shown). The recess 143 provides a diaphragm, or thin-walled section, 146 on the under surface of which is mounted a plurality of spaced parallel active anode segments 147. The segments 147 can be provided by arranging spaced metalized sections on the undersurface of the ceramic or can be provided by individual metal plates bonded to the ceramic. Interconnecting inductive circuitry, which can be an inductance element 148 formed as a metalized serpentine path or in any other suitable manner, is provided to complete the anode transmission line.

Additionally, the member 142 is formed with a peripheral ledge 150 across which are extended closely spaced parallel grid wires 151. Thus, the anode circuit and grid can be supported in predetermined fixed spaced relation and heat originating at the grid and anode segments can be conducted by the beryllia to a coolant circulated through the chamber provided by the recess 143. Additionally, the membrane-like construction of the bottom of the recess 143 and the location of the anode segment 147 in immediate direct contact with the member 146 enhances substantially the heat transfer to the cooling fluid being circulated in the coolant chamber.

While I have shown and described specific embodiments of my invention, I do not desire my invention to be limited to the particular forms shown and described, and I intend by the appended claims to cover all modifications within the spirit and scope of my invention.

What is claimed and desired to be secured by Letters Patent of the United States is:

1. An electric discharge device comprising
   (A) an envelope including a thermally conductive wall section,
   (B) a plurality of closely spaced electrode assemblies in said envelope,
   (C) said electrode assemblies comprising
      (1) an elongated planar cathode,
      (2) at least one elongated grid assembly, and
      (3) an elongated anode assembly,
      (4) said anode assembly comprising
         (a) an elongated electrically insulative thermally conductive support member,
         (b) a plurality of coplanar anode segments supported in a linear mutually spaced array on one side of said support member, said anode segments being interconnected by inductance means to provide a transmission line,
         (c) said support member including a plurality of transverse recesses disposed between said anode segments,
         (d) said recesses having greater width dimensions than the spaces between segments, and
         (e) said support member being in intimate heat transferring relation with said thermally conductive wall section of said envelope.

2. The invention as recited in claim 1 wherein said inductance means comprises a plurality of generally J-shaped inductive elements have the leg portions thereof extending through said support member with the legs of each said inductive elements electrically interconnecting end portions of immediately adjacent anode segments.

3. An electric discharge device comprising
   (A) an envelope including a thermally conductive wall section,
   (B) a plurality of closely spaced electrode assemblies in said envelope,
   (C) said electrode assemblies comprising an elongated planar cathode, and
   (D) at least one elongated grid assembly,
   (E) said grid assembly comprising
      (1) a pair of laterally spaced parallel ceramic bars having said cathode positioned therebetween,
      (2) a plurality of grid wires secured to and extending between the surfaces on one side of said ceramic bars and predeterminedly spaced relative to said cathode,
      (3) and an anode assembly comprising a plurality of spaced coplanar active segments mounted on an electrically insulative, thermally conductive support member,
      (4) said active segments being interconnected by inductance means to provide a transmission line,
      (5) said support member being in intimate heat transferring relation with said thermally conductive wall section of said envelope,
      (6) said intimate heat transferring relationship comprising an elongated sheet metal member extending from and bonded to the inner portion of the other side of at least one of said ceramic bars and providing a substantial thermal path to said wall section of said envelope.

4. The invention as recited in claim 3 wherein said wall section is also electrically conductive and an electrically conductive connection is provided between said cathode and said sheet metal member effective for maintaining said cathode at the operating potential of said wall section.

5. An electrical discharge device comprising
   (A) an envelope including a thermally conductive wall section and containing a plurality of closely spaced electrode assemblies,
   (B) said electrode assemblies comprising
      (1) an elongated planar cathode, and
      (2) a double control grid screen grid assembly,
      (3) said screen grid assembly comprising (a) a first pair of elongated ceramic bars,
(b) a plurality of control grid wires secured across each the upper and lower side of said bars,
(c) a second pair of elongated ceramic bars,
(d) said second pair of bars each engaging the outer side of one of said first mentioned bars and being of greater thickness than said first mentioned bars,
(e) a plurality of screen grid wires secured across each the upper and lower sides of said second mentioned pair of bars,
(f) and biasing means urging said first mentioned bars apart whereby all said grid wires are maintained taut,
(C) an elongated anode assembly,
(D) said anode assembly comprising
(1) a plurality of spaced coplanar active segments mounted on an electrically insulative, thermally conductive support member,
(2) said active segments being interconnected by inductnace means to provide a transmission line, and
(3) said support member being in intimate heat transferring relation with said thermally conductive wall section of said envelope.

6. An electrical discharge device comprising
(A) an envelope including a thermally conductive wall section and containing a plurality of closely spaced electrode assemblies,
(B) said electrode assemblies comprising
(1) an elongated planar cathode,
(2) said cathode comprising
 (a) an elongated channel-like metal member including a planar active surface,
 (b) an elongated heater element interposed between a pair of elongated sheet-like dielectric elements,
 (c) said heater element and dielectric elements being positioned in said channel-like member and held therein by a plurality of deformable tabs formed off each side of said metal member and bent into engagement with the outer one of said dielectric elements,
(3) at least one elongated grid assembly, and
(4) an elongated anode assembly,
(5) said anode assembly comprising
 (a) a plurality of spaced coplanar active segments mounted on an electrically insulative, thermally conductive support member,
 (b) said active segments being interconnected by inductance means to provide a transmission line, and
 (c) said support member being in intimate heat transferring relation with said thermally conductive wall section of said envelope.

7. The invention as recited in claim 6 wherein said thermally conductive support member is of a ceramic material and includes
(a) a coolant passage and a diaphragm-like wall section, and
(b) an active anode element bonded in intimate heat exchanging relation to the sides of said diaphragm-like section opposite said coolant passage.

8. The invention as recited in claim 7 wherein said support member includes a rim across which is supported a grid structure.

9. An electric discharge device comprising
(A) an envelope including a thermally conductive wall section and containing a plurality of closely spaced electrode assemblies,
(B) said electrode assemblies comprising
(1) an elongated planar cathode,
(2) at least one elongated grid assembly, and
(3) an elongated anode assembly,
(4) said anode assembly comprising
 (a) an elongated insulative, thermally conductive ceramic support member,
 (b) said support member including a coolant passage separated from one side thereof by thin walled section, and
 (c) an anode circuit comprising a linear array of a plurality of active anode segments bonded in heat transferring relation to the side of said thin walled section of said support member opposite said coolant passage, and
 (d) inductance means interconnecting said anode segments to provide an output transmission line,
 (e) said support member being in intimate heat transferring relation with the thermally conductive wall section of said envelope.

No references cited.

JAMES W. LAWRENCE, *Primary Examiner.*
ROBERT SEGAL, *Examiner.*